(12) United States Patent
Hurray et al.

(10) Patent No.: US 6,527,203 B2
(45) Date of Patent: Mar. 4, 2003

(54) TWO-COMPONENT DISPENSING GUN (76) Inventors: Paul Gregory Hurray, 1392 Hadden Cir., Akron, OH (US) 44313; Cris Damon Starr, 1189 Graymac Dr., N. Ft. Myers, FL (US) 33917

( * ) Notice: Subject to any disclaimer, the term of this patent is extended or adjusted under 35 U.S.C. 154(b) by 0 days.

(21) Appl. No.: 09/982,325

(22) Filed: Oct. 17, 2001

(65) Prior Publication Data

US 2002/0038826 A1 Apr. 4, 2002

Related U.S. Application Data (62) Division of application No. 09/471,994, filed on Dec. 23, 1999, now Pat. No. 6,345,776.

(51) Int. Cl.$^7$ ................................................. B05B 7/12
(52) U.S. Cl. .................... 239/413; 239/414; 239/432; 239/527; 239/600; 222/137; 222/145.6
(58) Field of Search ................................ 239/413, 414, 239/526, 432, 527, 600, 400, 416.1, 416.3, 428, 430, 487; 222/137, 145.6, 145.5, 256, 570; D9/447

(56) References Cited

U.S. PATENT DOCUMENTS

| | | |
|---|---|---|
| 2,890,836 A | 6/1959 | Gusmer et al. |
| 3,559,890 A | 2/1971 | Brooks |
| 3,784,110 A | 1/1974 | Brooks |
| 3,799,403 A * | 3/1974 | Probst et al. ............... 239/414 |
| 4,083,474 A * | 4/1978 | Waite et al. ............... 239/527 |
| 4,169,545 A * | 10/1979 | Decker .................... 222/145.5 |
| 4,676,437 A | 6/1987 | Brown |
| 4,901,888 A | 2/1990 | Standlick |
| 4,925,107 A | 5/1990 | Brown |
| 4,978,336 A * | 12/1990 | Capozzi et al. ............ 222/137 |
| 5,129,581 A | 7/1992 | Braun et al. |
| 5,219,097 A * | 6/1993 | Huber et al. ................. 239/414 |
| 5,242,115 A | 9/1993 | Brown |
| 5,255,892 A * | 10/1993 | McCormick ................. 251/321 |
| 5,271,537 A * | 12/1993 | Johnson ...................... 222/509 |
| 5,332,157 A * | 7/1994 | Proctor ....................... 239/145 |
| 5,429,308 A | 7/1995 | Brown |
| 5,462,204 A | 10/1995 | Finn |
| 5,645,199 A | 7/1997 | Schnitzler |
| 5,683,544 A | 11/1997 | Kopp |
| 5,887,756 A | 3/1999 | Brown |
| 5,918,772 A * | 7/1999 | Keller et al. .............. 222/145.6 |
| 6,021,961 A | 2/2000 | Brown |
| 6,189,735 B1 * | 2/2001 | Plasmati-Luchinger .. 222/145.5 |
| 6,345,776 B1 * | 2/2002 | Hurray ........................ 239/413 |

FOREIGN PATENT DOCUMENTS

ZA        99/02391        3/1999

* cited by examiner

Primary Examiner—Henry C. Yuen
Assistant Examiner—Dinh Q. Nguyen (57) ABSTRACT

A two-component dispensing gun has two longitudinally-extending dispensing passages receiving metering rods and in fluid communication with two feed passages adjacent to an especially configured metering rod tip and valve seats formed at the exit end of each dispensing passage. Valve seats of the dispensing passage extend as protrusions from the gun nose and are sealingly received within cup shaped recesses formed in a detachable, throwaway nozzle having a static mixing chamber. The nozzle has a truncated cone configuration which, in combination with the geometric configuration of the dispensing and feed passages alleviates turbulent flow of the liquid components until reaching the static mixer within the nozzle. A cammed surface on each metering rod in combination with a yoke crossbar formed as part of the gun's trigger provides increased motion of the trigger for fine or slow metering applications of the gun.

10 Claims, 8 Drawing Sheets

TWO-COMPONENT DISPENSING GUN

This patent application is a division of application Ser. No. 09/471,994, filed on Dec. 23, 1999, now U.S. Pat. No. 6,345,776, and incorporated herein by reference.

This invention relates generally to a dispensing apparatus for fluid products and more particularly, to a hand held gun which mixes and dispenses two fluid components.

The invention is particularly applicable and will be described with specific reference to a hand held dispensing gun for dispensing a two-component polyurethane foam. However, the invention in its broader application is not limited to polyurethane foams but has application to mixing and dispensing multi-component chemicals such as polyvinyls, paints, etc.

BACKGROUND

This invention is particularly suited for in situ applications of liquid chemicals mixed and dispensed as a spray or a foam and more specifically, to in situ application of polyurethane foam or froth. In situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in situ applications is typically supplied as a "one-component"froth foam or a "two-component" froth foam in portable containers hand carried and dispensed by the operator through either a valve or a gun. However, the chemical reactions producing the polyurethane froth foam in a "one-component" polyurethane foam is significantly different than the chemical reactions producing a polyurethane froth foam in a "two-component" polyurethane foam. Because the reactions are different, the dispensing of the chemicals for a two-component polyurethane foam involves different and additional concepts and concerns than that present in the dispensing apparatus for a "one-component"polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Reference, for example, can be had to U.S. Pat. No. 5,887,756 to Brown, issued Mar. 30, 1999 and U.S. Pat. No. 5,645,199 to Schnitzler, issued Jul. 8, 1997. While one-component guns can variably meter the polyurethane froth, they are typically used in caulk/glue applications where an adhesive or caulk bead is determined by the nozzle configuration. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.) Examples of two-component dispensing guns in commercial use today may be found in assignee's U.S. Pat. No. 5,429,308, to Brown, issued Jul. 4, 1995 and U.S. Pat. No. 5,242,115 to Brown, issued Sep.7, 1993. Additional commercial applications include U.S. Pat. No. 5,462,204 to Finn, issued Oct. 31, 1995; U.S. Pat. No. 5,129,581 to Braun et al., issued Jul. 14, 1992; and, U.S. Pat. No. 4,925,107 to Brown, issued May 15, 1990. These guns are improvements over early two-component dispensing gun designs such as shown in U.S. Pat. No. 2,890,836 to Gusmer et al., issued Jun. 16, 1959; United States Pat. No. 3,559,890 to Brooks, issued Feb. 2, 1971; and, U.S. Pat. No. 3,784,110 to Brooks, issued Jan. 8, 1974.

In a two-component polyurethane foam, the "A" and "B" components form the foam or froth when they are mixed in the gun. Of course, chemical reactions with moisture in the air will also occur with a two-component polyurethane foam after dispensing, but the principal reaction forming the polyurethane foam occurs when the "A" and "B" components are mixed or contact one another in the dispensing gun. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam (foam assumes consistency resembling shaving cream) is enhanced by the fluorocarbon (or similar) component, which is present in the "A" and "B" components. This fluorocarbon component is a compressed gas which exits in its liquid state under pressure and changes to it gaseous state when the liquid is dispensed into a lower pressure ambient environment, such as when the liquid components exit the gun and enter the nozzle.

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In the dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A"and "B" chemical formulations, the "A" and "B" containers are charged (typically with an inert gas) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. In practice, assignee has determined that invariably the gun operator adjusts the ratio settings to improve gun "performance" with the expected poor result. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Besides the ratio control which distinguishes two-component dispensing guns from one-component dispensing guns, a concern which affects all two-component gun designs (not present in one-component dispensing guns) is known in the trade as "cross-over". Generally, "cross-over" means that one of the components of the foam ("A" or "B") has crossed over into the dispensing mechanism in the dispensing gun for the other component ("B" or "A"). Cross-over may occur when the pressure variation between the "A" and "B" cylinders becomes significant. Variation can become significant when the foam formulation initially calls for the "A" and "B" containers to be at high differential charge pressures and the containers have discharged a majority of their components. (The containers are accumulators which inherently vary the pressure as the contents of the container are used.) To overcome this problem, it is known to equip the guns with conventional one-way valves, such as a poppet valve. While necessary, the dispensing gun's cost is increased.

Somewhat related to cross-over and affecting the operation of a two-component gun is the design of the nozzle. The nozzle is a throw away item detachably mounted to the gun nose. Nozzle design is important for cross-over and metering considerations in that the nozzle directs the "A" and "B" components to a static mixer in the gun. One gun described in U.S. Pat. No. 5,462,204 completely divides the nozzle into two passages by a wall extending from the nozzle nose to the mixer. The wall lessens but does not eliminate the risk of cross-over since the higher pressurized component must travel into the mixer and back to the lower pressure metering valve before cross-over can occur. However, the nozzle design illustrated in U.S. Pat. No. 5,462,204 patent may be limited because of the wall and nozzle inlet chamber tending to create turbulence for applications requiring very high flow rates.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed as throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The dispensing gun of the present invention is particularly suited for use in two-component polyurethane foam "kits" typically sold to the building or construction trade. Typically, the kit contains two pressurized "A" and "B" cylinders of about 7½ inches in diameter which are pressurized anywhere between 150–250 psi, a pair of hoses for connection to the cylinders and a dispensing gun, all of which are packaged in a container constructed to house and carry the components to the site where the foam is to be applied. When the chemicals in the "A" and "B" containers are used up, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

The dispensing guns cited and to which this invention relates are additionally characterized and distinguished from other types of multi-component dispensing guns in that they are "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The use of the term "airless" as used in this patent and the claims hereof means that the dispensing apparatus is not provided with an external, cleaning or purging mechanism.

While the two-component dispensing guns discussed above function in a commercially acceptable manner, it is becoming increasingly clear as the number of in situ applications for polyurethane foam increase, that the range or the ability of the dispensing gun to function for all such applications has to be improved. As a general example, the dispensing gun design has to be able to throttle or meter a fine bead of polyurethane froth in a sealant application where the kit is sold to seal spaces around window frames, door frames, and the like in the building trade. In contrast, where the kit is sold to form insulation, an ability to meter or flow a high volume flow of chemicals is required. Still yet, in an adhesive application, liquid spray patterns of various widths and thickness are required. While the "A"and "B" components for each of these applications are specially formulated and differ from one another, one dispensing gun for all such applications involving different formulations of the chemicals is needed.

SUMMARY OF THE INVENTION

Accordingly, a principal object of the present invention is to provide an improved, airless two-component dispensing gun, suitable for use with any number of two-component polyurethane foam formulations requiring metering of the foam over a wide flow range.

This object along with other features of the present invention is achieved in an airless, two-component polyurethane foam dispensing gun which includes a body having a longitudinally-extending valve portion containing a pair of laterally displaced, generally parallel, and straight, longitudinally-extending tubular dispensing passages, each dispensing passage having a conical valve seat at one end and an open end at its opposite end which, in turn, forms a metering rod opening in the body. A generally straight feed passage extends along a feed passage axis for each dispensing passage and each feed passage has a discharge end in fluid communication with a dispensing passage between the dispensing passage's valve seat end and the metering rod opening. The feed passage axis forms an acute angle of less than about 30° with the dispensing passage. A longitudinally-extending metering rod is positioned in each dispensing passage with the metering rod having a conical valve tip at one end, a yoke collar section at its opposite end and an intermediate tubular seating section for sealing and guiding the metering rod within the dispensing passage. A nozzle is detachably connected in a sealing manner to the nose portion of the gun and has an outlet tip at one end, an inlet chamber at its opposite end and a static mixing chamber containing a static mixer therebetween. A spring is in contact with the yoke collar of each metering rod and biases the valve tip of each metering rod into contact with the valve seat of each dispensing passage and a manually operable trigger moves the metering rod against the bias of the spring. The arrangement of the feed and dispensing passages minimizes turbulent flow of the components as they travel through and are metered from the gun permitting the gun to better achieve ratio control over a wide flow range, as well as the maximum flow output allowable by the viscosity/gas pressure combination of the "A" and "B" components.

In accordance with another aspect of the invention, the gun body has a transversely extending handle portion, a longitudinally-extending, open ended spring portion generally aligned with the dispensing passages and generally transversely adjacent the handle portion and a longitudinally-extending trigger recess portion between the body's valve portion and the spring portion. A trigger having a trigger yoke crossbar portion is received within the trigger recess and a trigger lever portion transversely extends from the crossbar. The crossbar has a pair of laterally spaced metering rod openings through which the intermediate sections of each metering rod extends. The trigger also has a trigger pivot portion transversely extending from the crossbar in a direction opposite the trigger level and the trigger pivot extends into a generally U-shaped portion of the recess which is transversely spaced from the metering rods to provide a "floating" pivot. The metering rods have a yoke collar section at their end opposite the end containing their conical valve tip and are larger in diameter than the metering rod openings in the crossbar. The yoke collar section has an annular collar surface extending radially outward at the intersection of the metering rods intermediate section which is sealingly and slidably disposed within and extends from the dispensing passage. The annular collar surface is adjacent the yoke crossbar and is chamfered at a set angle to produce a cam pivot which provides increased rotational movement of the trigger lever about the trigger pivot which allows for better operator control in fine metering applications while the crossbar positively assures equal movement of both metering rods.

In accordance with another feature of the invention, improved variable metering of flow occurs throughout the entire length of trigger actuation and beyond the fine metering characteristics of the dispensing gun. The metering rods conical valve tip end section includes a generally cylindrical tip portion ending in a truncated conical portion, in turn, ending in a larger cylindrical portion which, in turn, ends in the intermediate sealing section of the metering rod which extends through the yoke crossbar's opening. The valve seat in the dispensing passage is formed as a frusto-conical valve seat so that retraction of the metering rod in the dispensing passage opens the conical valve seat in the normal manner. The design advantageously utilizes the physical properties of two component polyurethane foams. Specifically, the "compressed gas" components of the liquid "A" and/or "B" components (i.e., fluorocarbons) changes from a liquid state to a gas state and the pressurized liquid exits the pressurized environment of the gun into the ambient (lower pressure) environment of the nozzle. As the metering rods (needles) are pulled back, an ever increasing volume of pressurized liquid is moved closer to the cylindrical valve seat opening and the lower pressure environment of the nozzle. In so doing, the compressed gas component in the liquid phase beings to expand to the gaseous state, providing an increasing amount of back pressure exerted on the liquid chemicals. The invention recognizes and utilizes this characteristic of two component polyurethane foams, by maintaining the truncated conical portion of each metering rods within the frusto-conical valve seat throughout the longitudinal travel of the metering rod to obtain desired metering. Importantly, the conical angles (of the valve seat and truncated conical portion of the metering rod) are maintained at acute angles not greater than 10° and the dimensioning of the components is such that the orifice of the dispensing gun continuously increases as the gun is progressively actuated with full throttle establishing an orifice size equal to or less than the area of the frusto-conical valve seat at its minor diameter. That is, metering occurs between frusto-conical valve seat and cylindrical tip portion of metering rod through dispensing gun travel and not at the minor diameter opening of the frusto-conical valve seat.

In accordance with an alternative embodiment feature of the invention, the frusto-conical valve seat may have a cylindrical opening extending from its minor diameter which receives the cylindrical tip portion of the metering rod when the conical portion of metering rod seats against the frusto-conical valve seat in an "off" position of the dispensing gun. Upon initial application of the dispensing gun causing retraction of the metering rod, a generally constant orifice exists between the cylindrical tip portion of the metering rod and the cylindrical opening of the valve seat to permit constant "fine" metering of the components until the cylindrical tip portion of the metering rod is fully within the frusto-conical portion of the valve seat whereat variable metering occurs as described above.

In accordance with another aspect of the invention, the detachable nozzle connected in a sealing manner to the nose surface of the gun has an outlet tip at one end, an inlet chamber at its opposite end adjacent the nose and a static mixing chamber containing the static mixer therebetween. The cross-sectional area of the inlet chamber at a position adjacent the nose surface of the dispensing gun is larger than the cross-sectional area of the inlet chamber at its intersection with the mixing chamber and the inlet chamber is generally formed as a truncated cone which funnels each component along the walls thereof into the mixing chamber in a manner which alleviates turbulent flow and tends to maintain the components unmixed until reaching the static mixer. An advantage of this nozzle design is the increase in "clogging time", a desirable feature, which is the time it takes curing foam to clog an attached nozzle after a gun has been recently used. Thus, the non-turbulent flow reducing characteristics of the gun characterized by the geometry of the dispensing passages, feed passages and metering rods described above is continued in the nozzle design, all of which contribute to the ability of the gun to maintain ratio control of the "A" and "B" liquid components, maximize flow output and extend the "clogging" time.

In accordance with another aspect of the invention, an improvement is provided in a detachable nozzle for use in a two-component dispensing gun having a pair of valve seat openings formed in two protrusions which extend from the nose of the gun through which each component is dispensed. The improved nozzle has a back plate filling and closing one end of the nozzle and the back plate has a pair of cup shaped recesses for receiving the protrusions when the nozzle is attached to the dispensing gun with the back plate adjacent or abutting the nose of the dispensing gun. Each cup shaped recess has a valve extension seat opening which is in registry with the valve seat opening in each protrusion. A resilient strip of material pinned to the back plate and extending over a valve seat extension opening is provided. The resilient material flexes out of contact with the valve seat extension opening when the pressure of the liquid component discharge through the valve seat opening is greater than the pressure of the liquid components in the nozzle. Importantly, when the pressure of the liquid components within the nozzle is greater than the pressure of the liquid components in the protrusion, the resilient strip seals the valve seat extension opening whereby cross-over into the dispensing gun between the liquids within the nozzle is alleviated.

In accordance with a still further feature of the invention, the stiffness of the resilient material in the nozzle is chosen depending on the dispensing gun application. Generally, the resilient material may have sufficient rigidity to seal valve extension opening when the pressure of the liquid component in the gun is below a set pressure whereby post drip of the dispensing gun is improved when metering is stopped. Alternatively, the dispensing gun may be supplied with "fine" metering nozzles which may be equipped with relatively stiff resilient material to cause fine metering of the components.

In accordance with still another important aspect of the invention, the back plate and the nozzle in the valve seat protrusions extending from the gun's nose are plastic and the exterior surface of the base of the cup shaped recess has a sealing ring concentric with the valve seat extension opening formed in the recess. By selecting plastics of different hardness, the sealing ring resiliently deforms or is resiliently deformed by the end face of the protrusion when the nozzle is affixed to the dispensing gun.

In accordance with still yet another aspect of the invention, the metering rod's generally cylindrical tip portion extends into the valve seat's extension opening in the cup shaped recess of the back. The valve seat's extension opening may have a smaller or equal diameter to the valve seat's minor frusto-conical diameter in the gun protrusions providing a generally constant fine metering of the components at initial actuation of the trigger whereat the cammed surface on the annular collar of the metering rod provides increased travel of the trigger lever.

In accordance with a still further aspect of the invention, the dispensing gun has a handle body portion transversely extending from a spring body portion of the dispensing gun and adjacent the trigger lever. The handle has at least one groove formed therein opening to face the trigger lever and the trigger lever has a transversely extending trigger lever recess which opens to the handle portion. A lock tab is provided which is pivotably mounted within the trigger lever recess and is operator actuated from a stored position where the lock tab is contained within the trigger lever recess to a locked position whereat the lock tab is pivoted out of the trigger lever recess into the groove rendering the dispensing gun inoperable for dispensing the foam components. Significantly, the handle has a plurality of grooves which open to the trigger lever and are transversely spaced at set distances on the handle and the lock tab is pivotably movable out of the trigger recess to positions aligned with any one of the handle grooves whereby slow or fine metering of the gun can be positively controlled by the locking tab.

It is thus an object of the invention to provide a two-component dispensing gun which is able to maintain ratio control of the components over a wide flow range.

It is another object of the present invention to provide a two-component dispensing gun which is able to achieve fine or slow metering of the components, either through variable metering or, alternatively, constant metering over a fine metering range.

Yet another object of the invention is to provide a two-component dispensing gun which is able to accurately meter the components in a controllable manner over the complete flow/pressure ranges of the dispensing gun, i.e., from a wide open, full flow condition to slow, low flow, condition.

A still further object of the invention is to provide a two-component dispensing gun which, through its design, allows maximum achievable flow rates in a progressively variable metering manner to be realized for a wide combination of chemical formulations/pressures used in the "A" and "B" froth of two-component polyurethane foams.

It is another object of the invention to provide a two-component dispensing gun which alleviates cross-over.

Still a further object of the invention is to provide an improved nozzle for use in a two-component dispensing gun.

Still another object of the invention is to provide a two-component dispensing gun suitable for a wide range of in situ applications of polyurethane foam having different formulations with the only change required to the dispensing gun for the significantly different applications being the supply of different, detachable, throw-away nozzles for significantly different dispensing gun applications.

Still another general object of the present invention is to provide a two-component dispensing gun which is inexpensive to manufacture, simple in design and has a wide range of applications.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and arrangement of parts taken together and in conjunction with the attached drawings which form a part of the invention and wherein.

DETAILED DESCRIPTION OF THE INVENTION

Figure 1:
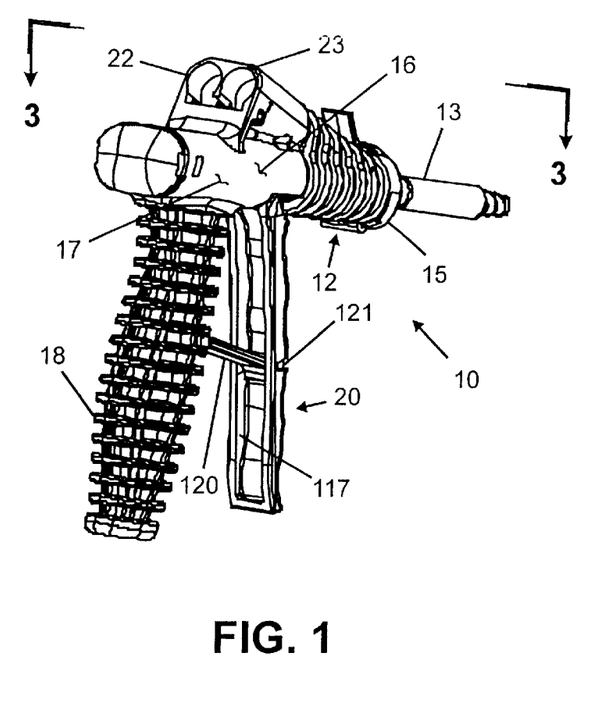
FIGS. 1 and 2 are perspective views of the dispensing gun of the present invention.
Figure 2:
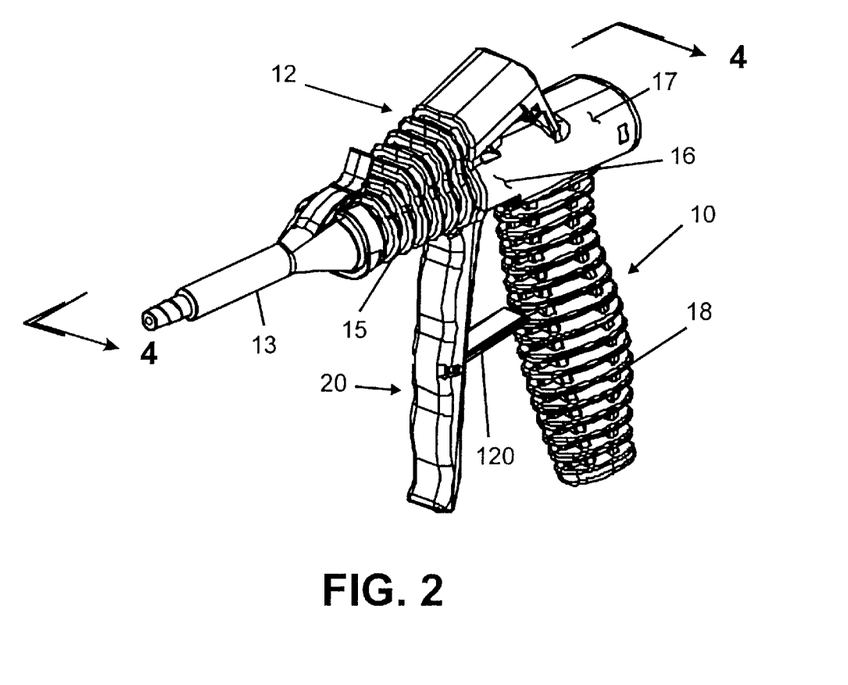

Referring now to the drawings wherein the showings are for the purpose of illustrating preferred and alternative embodiments of the invention and not necessarily limiting the invention, there is shown in perspective views in FIGS. 1 and 2 an airless (as that term is defined in the Background) two-component dispensing gun 10. Dispensing gun 10 may be viewed as comprising a one-piece gun body 12 (which includes components to be described) to which is detachably secured a disposable nozzle 13. In the preferred embodiment, the gun is molded from polypropylene and the nozzle is molded from an ABS (Acrylonitrile-Butadiene-Styrene) plastic. While one of the objects of the invention is to provide an inexpensive dispensing gun achieved in part by molding gun body 12 and nozzle 13 from plastic, the invention in its broader sense is not limited to a dispensing gun molded from the particular plastics specified nor, in fact, is the invention limited to a dispensing gun manufactured from plastic.

Gun body 12 may be further defined as having integral portions including a longitudinally-extending valve portion 15 to which nozzle 13 is connected and terminating at a longitudinally-extending trigger portion 16, in turn, terminating at a longitudinally-extending spring portion 17 from which transversely extends a handle portion 18. Within gun body housing 12 is a pair of hose openings 22, 23, canted as shown, to which the "A"and "B" hoses (not shown) are attached, respectively, by conventional quick connect couplings or retaining mechanisms. Dispensing gun 10 is also provided with a trigger 20 extending within trigger body portion 16. It should be appreciated that when the operator grasps dispensing gun 10 about handle 18 for finger actuation of trigger 20, that the position of hose openings 22, 23 is such that the kit hoses will drape over the operator's forearm which surprisingly is preferred over other conventional hose attachment positions on the dispensing gun. For example, if the hose connections were attached to the handle bottom, it is possible for the hoses to become entangled with the operator's feet. If the hoses are attached to the rear end of the gun, the hoses rest on the operator's wrist. If the hoses are conventionally attached to the top of the gun, they can drape on either side of the gun and distort the pistol feel of the gun. Canting hose openings 22, 23 is thus believed to provide some ergonomic benefit while contributing to the improved performance of dispensing gun 10 as described below.

Figure 3:
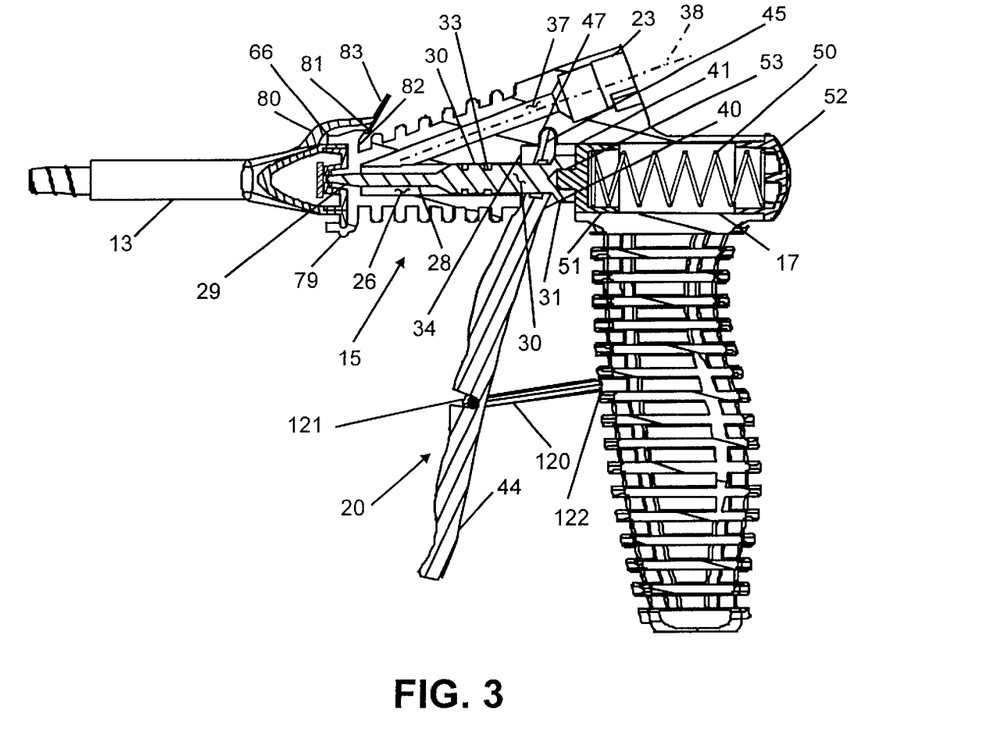
FIG. 3 is a section view of the dispensing gun of the present invention taken generally along line 3—3 of FIG. 1.
Figure 4:
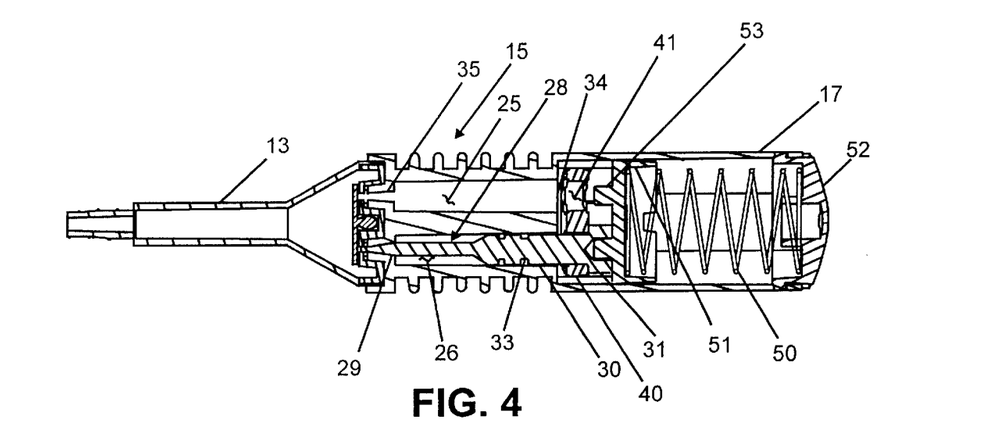
FIG. 4 is a section view of the dispensing gun of the present invention taken generally along line 4—4 of FIG. 2.

Referring now to FIGS. 3 and 4, dispensing gun 10 is shown in vertical and horizontal cross-section views, respectively, to best illustrate the overall relationship of the gun components. In gun body valve portion 15, there is formed a pair of parallel, open ended, laterally displaced and straight dispensing passages 25,26 which are identical to one another so that a description of one dispensing passage such as a dispensing passage 25 for component "A" will apply to the other dispensing passage 26. Within each dispensing passage is placed a longitudinally-extending metering rod 28 and the metering rod for dispensing the "A" component in passage 25 is not shown in FIG. 4 for drawing clarity. Metering rod 28 will be defined in further detail below but generally has a tip section 29 at one end terminating in an intermediate sealing section 30, in turn, terminating at a yoke collar section 31 at the opposite end of metering rod 28. Metering rod sections 29, 30 and 31 are cylindrical in the preferred embodiment but conceptually could be tubular. Each metering rod 28 has a pair of grooves 33 for an O-ring seal (not shown) to prevent the liquid component in dispensing passage 25 or 26 from escaping out an end opening 34 in each dispensing passage 25, 25 through which intermediate sealing section 30 extends. The opposite end opening of each dispensing passage 25,26 is formed as an especially configured valve seat 35 which will be explained in further detail below.

For consistency in terminology, when describing dispensing gun 10, "longitudinal"will refer to the direction of the dispensing gun along the long axis of dispensing passage 25, 26 or metering rods 28, i.e., x—x plane; "transverse" will refer to the direction of the gun along the long axis of handle portion 18, i.e., z—z plane; and, "laterally" will refer to the direction of the gun such as the distance spanning the spacing between dispensing passages 25, 26, i.e., the y—y plane.

Within valve body portion 15 are two laterally spaced and straight feed passages 37 in fluid communication at one end with a hose opening 22 or 23 and at the opposite end with dispensing passage 25 or 26 at a position in a dispensing passage adjacent valve seat 35. Feed passage 37 extends along an axis 38 which forms an acute angle of about 20°0 with dispensing passage 25 or 26, preferably extending not greater than about 30°. The geometric arrangement of a longitudinally-extending dispensing passage through which a sealed metering rod extends with a feed passage in between the metering tip of the metering rod and the rod seal is somewhat similar to conventional arrangements used in one-component dispensing guns such as sold by the assignee of the present invention and examples of which may be found in U.S. Pat. No. 5,887,756 to Brown, issued Mar. 30, 1999; U.S. Pat. No. 5,683,544 to Kopp, issued Nov. 4, 1997; and U.S. Pat. No. 5,645,199 to Schnitzler, issued Jul. 8, 1997. However, the one-component guns introduce the one-component foam at a position spaced from the dispensing passage's valve seat and form angles with the feed passages larger than the acute angle of the present invention. Based on a review of existing two-component gun designs, it was concluded that improved metering of the dispensing gun is achieved if turbulent flow of the "A" and "B"components through the dispensing gun can be alleviated or minimized. Simply put, if abrupt changes in flow direction of the liquid foam components within the gun are avoided, improved gun operation will result. The arrangement of feed passages 37, dispensing passages 25, 26 and metering rods 28 is believed to alleviate or reduce turbulent flow of the liquid components through dispensing gun 10. Somewhat surprisingly, other two-component dispensing guns utilizing a "straight through" design in that the hoses are secured to the gun at the rear gun end changes the flow direction of the liquid component within the gun. Reference can be had to U.S. Pat. No. 5,462,204 to Finn, issued Oct. 31, 1995; U.S. Pat. No. 4,676,437 to Brown, issued Jun. 30,1987; and South African provisional patent application 99/02391, filed Mar. 29, 1999, somewhat similar to Brown U.S. Pat. No. 4,676, 437 which show "straight through" dispensing guns but which, nevertheless, use valving arrangements which change flow direction. (Note that the South African patent specification does disclose in one embodiment, compression of a flexible supply conduit to achieve metering which will alleviate turbulent flow. However, durability concerns are present in such an arrangement.) Additionally, U.S. Pat. No. 4,901,888 to Standlick shows the dispensing passage-feed passage-metering rod arrangement used in one-component dispensing guns applied to a two-component gun but the feed passage is formed at an abrupt angle to the dispensing passage and is spaced from the valve seat. As will be explained further below, the non-turbulent characteristics present in gun body 12 of the present invention is carried through in the design of nozzle 13.

Referring still to FIGS. 3 and 4, trigger 20 has a yoke crossbar portion 40 with a pair of elongated metering rod openings 41 formed therein through which intermediate sealing section 30 of each metering rod extends. Extending transversely from yoke crossbar portion 40 of trigger 20 in the direction of handle 18 is a recessed trigger lever 44. Transversely extending from the opposite side of yoke crossbar portion 40 is a rounded trigger pivot portion 45. Trigger pivot portion 45 fits within a U-shaped trigger recess 47 formed within trigger body portion 16. Trigger pivot portion 45 is not pinned or journaled within U-shaped recess 47 and can be viewed as floating. Movement of trigger lever 44 causes trigger pivot 45 to pivot within trigger recess 47 moving yoke crossbar 40 into contact with yoke collar section 31 of each metering rod 28 in a manner which causes metering of the "A" and "B" liquid components as will be described further below.

Within spring body portion 17 of dispensing gun 10, which is open ended, is positioned a single spring 50. Spring 50 is compressed between an inner spring retainer 51 and an outer spring retainer 52 which perhaps, as best shown in FIG. 4, has a bayonet clip which snaps into openings in spring body portion 17. Inner spring retainer 51 has a pair of tubular projections 53 extending therefrom which fit within openings formed in the rear surface of yoke collar section 31. The design of inner spring retainer 51 thus provides a form of alignment assuring equal travel of each metering rod 28 in dispensing passages 25, 26. In conventional, two-component dispensing guns in commercial use, separate springs are provided for each metering rod (perhaps to provide different spring forces for each metering rod). As noted in the Background, the polyurethane foam or froth components under discussion are formulated to provide equal ratios of the "A" and "B" components. When separate springs are used, it is possible for one spring to set when compared to the other spring, tending to result in an off ratio dispensing gun. Two-component dispensing gun 10 of the present invention avoids this concern by using a single spring in combination with inner spring retainer 51 and yoke crossbar 40 of trigger 20 to assure that movement of trigger 20 will result in equal movement of both metering rods 28 in dispensing passages 25, 26. Equal ratio metering is mechanically forced and the single spring 50 exerts a constant force on both metering rods 28 so that binding within metering rod openings 41 of trigger crossbar portion 40 does not occur.

Dispensing gun 10 is easily assembled. Trigger 20 is inserted into gun body 12 such that trigger pivot portion 45 is within trigger recess 47. Each metering rod 28 is then inserted through spring body portion 17 into its dispensing passage 25 or 26. Inner spring retainer 51 is then inserted within spring body portion 17. Spring 50 is then inserted and compressed when outer spring retainer 52 is snapped by the bayonet clips into spring body portion 17.

Figure 5:
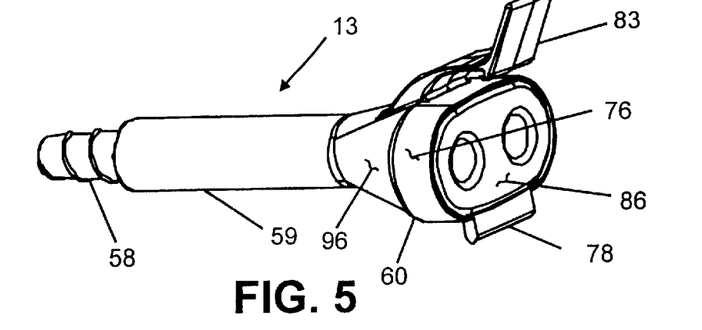
FIGS. 5 and 6 are perspective views of the nozzle used in the present invention.
Figure 6:
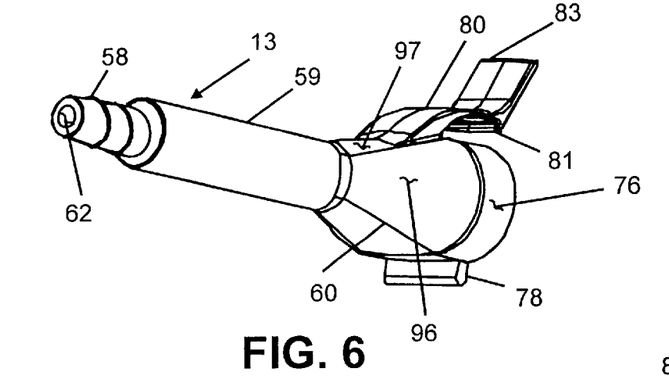
Figure 7:
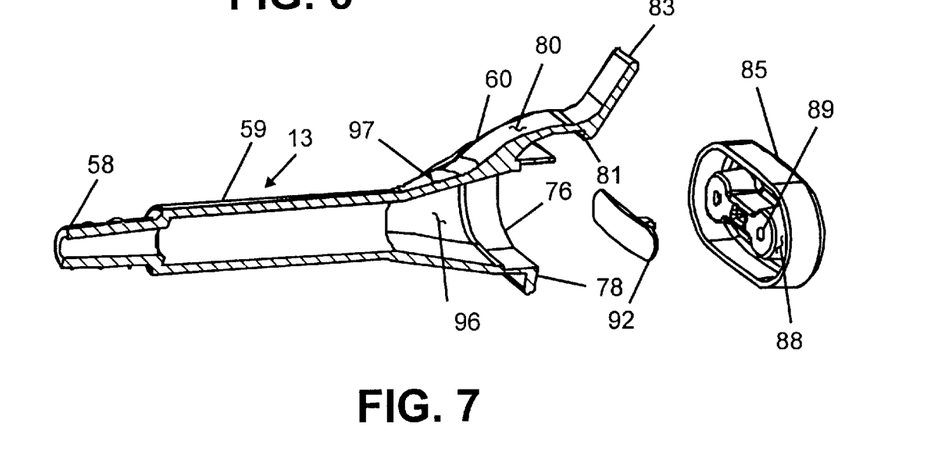
FIG. 7 is an exploded view of the nozzle shown in FIGS. 5 and 6.
Figure 8:
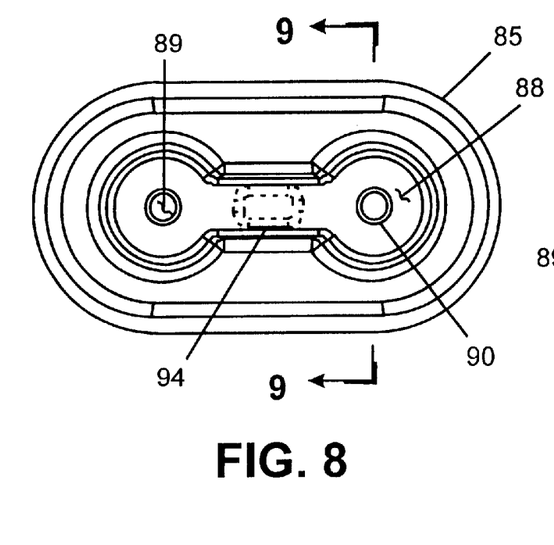
FIG. 8 is a front view of the back plate used in the nozzle of the present invention.
Figure 9:
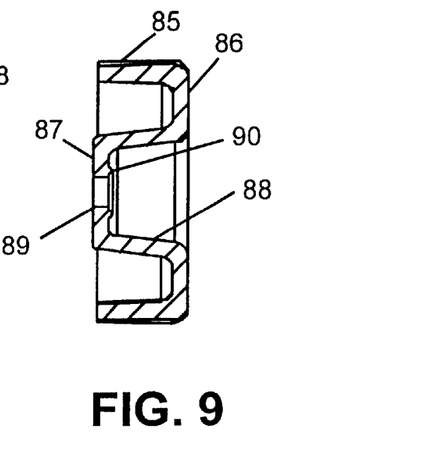
FIG. 9 is a section view of the back plate taken generally along the lines designated 9—9 of FIG. 8.
Figure 10:
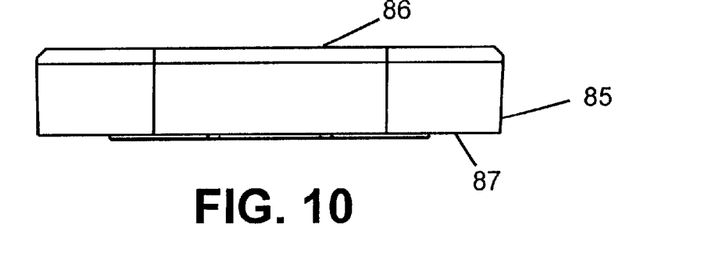
FIG. 10 is a top view of the back plate.
Figure 11:
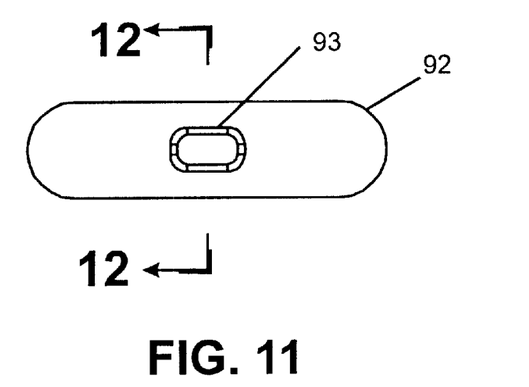
FIG. 11 is a front view of the one-way valve of the present invention.
Figure 12:
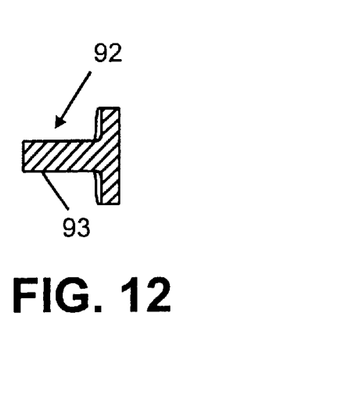
FIG. 12 is a cross-section view of the one-way valve of FIG. 11 taken along line 12—12 of FIG. 11.

Referring now to FIGS. 5, 6 and 7, nozzle 13 has an outlet tip section or outlet tip 58, a mixing chamber section or a mixing chamber 59 and an inlet chamber section or inlet chamber 60. Nozzle 13 is molded so that each section, 58, 59, 60 is an integral part of nozzle 13. However, dispensing tip 58 can be separately molded and threaded into mixing chamber 59 to permit a variety of differently shaped dispensing tips 58 to be fitted to nozzle 13. Alternatively, different tips may be threaded onto or into dispensing tip 58. Different gun applications may require different spray patterns other than the conical spray pattern which will be produced through nozzle tip opening 62 provided in dispensing tip 58 of nozzle 13 shown in FIGS. 5–7. Reference can be had to assignee's U.S. Pat. No. 5,429,308 for a discussion of various shaped nozzle tip openings 62. Making outlet tip 58 detachable from mixing chamber 59 such as by a threaded engagement, allows for a variety of spray patterns. Within mixing chamber 59, which is cylindrical, is a conventional static mixer (illustrated schematically in part as reference numeral 63 in FIG. 15).

Figure 15:
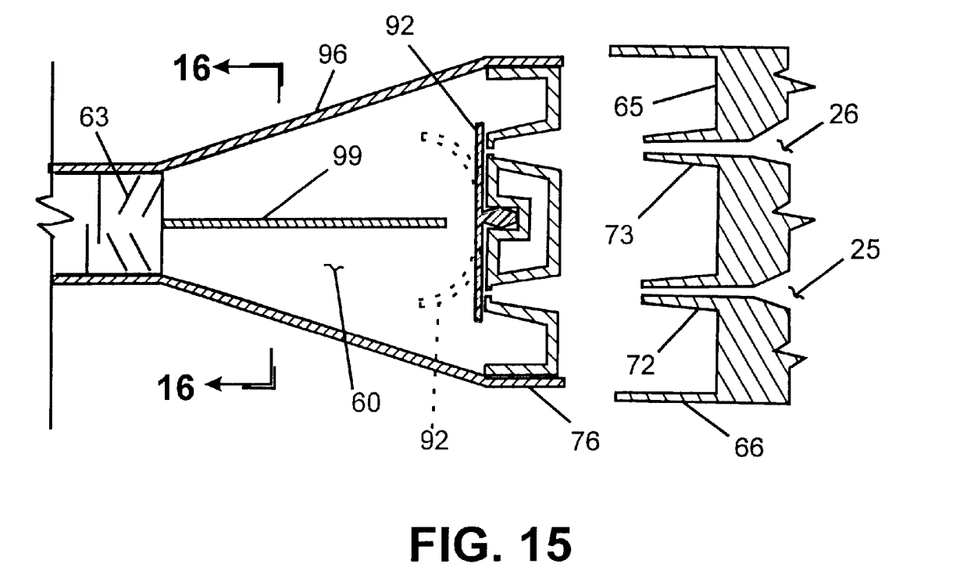
FIG. 15 is a schematic section view of an alternative embodiment of the nozzle of the present invention.
Figure 18:
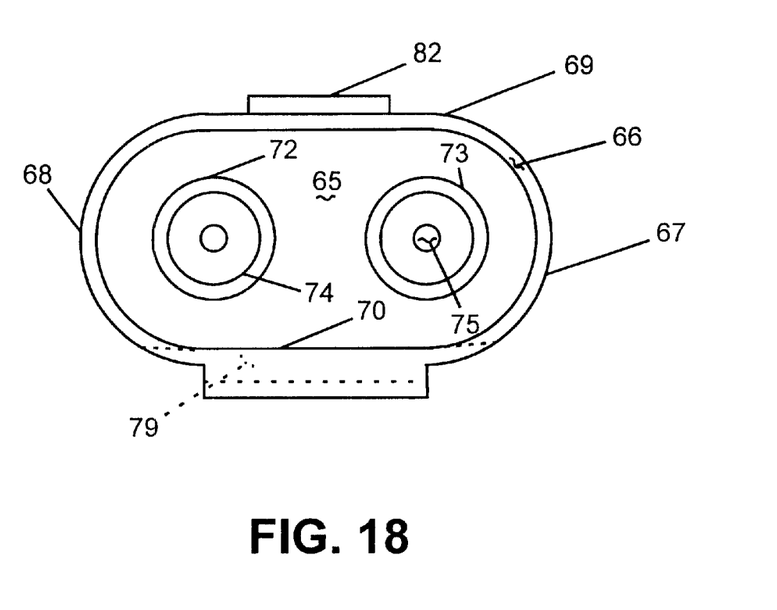

Nozzle design is essential to the proper functioning of any two-component dispensing gun. In accordance with the invention, inlet chamber 60 introduces the "A" and "B" components to static mixer 63 in a somewhat non-turbulent manner and with only minimal contact between the "A" and "B" components so that static mixer 63 can effectively perform its mixing function. More particularly, the shape, construction and relationship of inlet chamber 60 relative to dispensing passages 25, 26 and relative to mixing chamber 59 is important. Perhaps as best shown in FIGS. 15 and 18, to which reference should be had, dispensing passages 25, 26 exit valve gun portion 15 at a flat nose surface 65 in valve body portion 15. Flat nose surface 65 is defined by an edge from which an edge lip 66 protrudes. Edge lip 66, in the preferred embodiment, is defined by two identical, laterally spaced semi-circular edge portions 67, 68 connected to one another by laterally extending straight edge portions 69, 70 transversely spaced from one another. Alternatively, and somewhat conceptually preferable, edge lip 66 could be circular.

Longitudinally-extending from nose surface 65 and concentric with semi-circular edge lip portion 67, 68 are a pair of valve seat protrusions 72, 73 forming or continuing the metering tip valve seats of dispensing passages 25, 26 respectively. Each valve seat protrusion 72, 73 has a flat end surface 74 through which a central valve seat opening 75 extends. Valve seat opening is the minor diameter of a frusto-conical surface which defines valve seat 35 in the preferred embodiment.

Referring again to FIGS. 5, 6 and 7, inlet chamber 60 of nozzle 13 has a collar section 76 extending from its entrance end which is in the shape of nose edge and fits within nozzle edge lip 66. Extending laterally and transversely from the bottom portion of collar section 76 is a positioning tab 78. When nozzle 13 is applied to dispensing gun 10, positioning tab 78 fits within a nozzle recess 79 best shown as extending between dash lines in FIG. 18 and shown in cross-section in FIG. 3. Extending transversely upward from collar section 76 is a latch 80 which has a lock surface 81 adapted to engage a snap ledge 82 longitudinally-extending from nose edge lip 66 in the rearward direction perhaps as best shown in FIG. 3. To apply, the gun operator grasps nozzle 13 by its outlet tip 58 and mixing chamber 59 and inserts positioning tab 78 into nozzle recess 79. At this point, nozzle 13 will be at a slight downward angle relative to gun nose surface 65. As the remaining portion of collar section 76 is brought within edge lip 66, positioning tab 78 will rotate within nozzle recess 79 so that snap ledge 82 will snap into locking engagement with lock surface 81. To remove nozzle 13, the gun operator depresses a latch tip 83 formed in latch 80 to unseat lock surface 81 on snap ledge 82. Nozzle 13 can then be rotated so that positioning tab 78 can be lifted from nozzle recess 79. The latch mechanism described in the preferred embodiment is particularly preferred because the rigidity of latch 80 can be designed in combination with the lever force exerted by the operator to achieve desired sealing of nozzle 13 to gun body 12. However, other arrangements which will produce desired sealing can be employed. In particular, collar section 76 of nozzle 13 and edge lip 66 of gun nose surface 65 can be made circular and provided with a mason jar lid type thread. The pitch of the thread can be established to produce the desired sealing in less than 360° of rotation. Still another mechanism for attaching nozzle 13 to gun body 12 would be to simply provide the nozzle with opposing bayonet clips which would snap into recesses or clip holders formed into gun body 12 adjacent nose surface 65 or vise-versa. Thus, in its broader sense, the invention contemplates attaching nozzle 13 to gun body 12 in a sealing manner either through pivoting such as shown by latch 80, or by rotation such as by a threaded connection or by a straight, snap in connection such as achieved by bayonet type clips.

Referring now to FIGS. 7, 8, 9 and 10, a backplate 85 having an edge configuration similar to collar section 76 is permanently affixed to collar section 76 of nozzle 13. Backplate 85 is "glued" to nozzle collar section 76 and is sealed thereto about its entire periphery. Because nozzle 13, in the preferred embodiment, is an ABS plastic, it lends itself to "solvent welding" with a variety of common solvents. Backplate 85 has a forward surface 86 and a rearward surface 87 shaped as shown to provide a pair of cup shaped recesses 88 opening to nozzle face surface 65. At the base of each cup shaped recess 88 is a valve extension opening 89 and a sealing rib 90 extends from the base of cup shaped recess 88 circumscribing valve seat extension opening 89. Sealing rib 90 thus contacts flat end surface 74 of each valve seat protrusion when nozzle 13 is latched to gun body 12. Because the plastic composition of nozzle 13 has a different hardness than the plastic composition of body 12, a deformation will occur between sealing lip 90 and flat end surface 74 with the positive lock nozzle arrangement described above. In the preferred embodiment, nozzle 13 is harder than the plastic of gun body 12 so that sealing lip 70 will deform flat end surface 74 to effect sealing of nozzle 13 to gun body 12. However, the deformation from sealing is not beyond the memory of the plastic so that permanent set is not experienced in the gun body and any number of nozzles can be repeatedly sealed to gun body 12. Nozzle sealing conventionally occurs in commercial applications by means of conventional O-rings and like resilient seals. However, in U.S. Pat. No. 4,925,107 to Brown, issued May 15, 1990 (and U.S. Pat. No. 5,129,581 to Braun et al., issued Jul. 14, 1992), a plastic seal is said to be formed by barbs in nozzle protrusions fitting within valve dispensing passages. This is not believed an especially effective seal at higher pressures of the gun application because a positive force, as in the present invention, is not constantly asserted against the seal.

Referring now to FIGS. 7, 8, 11 and 12, a resilient strip 92 of flexible material such as any number of plastics (ABS is used in the preferred embodiment) or natural or synthetic rubber or similar elastomers is secured to rear surface 87 of backplate 85 by an attachment portion 93 wedged into centrally positioned attachment recess 94 formed in backplate 85 and opening to rearward surface 87 thereof. Resilient strip 92 as best shown in FIG. 4 extends over to cover valve seat extension openings 89. Resilient strip 92 acts as a flapper valve to prevent crossover. When dispensing gun 10 is operated, pressure of the "A" and "B" liquid components will force resilient strip 92 to flex away from valve seat extension openings 89 to a flex position such as shown by the dash lines in FIG. 15. Should one of the components significantly drop in pressure, so that the pressure in nozzle inlet chamber 60 is greater than the pressure in one of the dispensing passages 25, 26, the resilient strip 92 will cover that dispensing passage's valve seat extension opening 89. This provides an effective one way valve positively sealing dispensing passages 25 and 26 in the event a cross-over condition occurs. Preferably, a single resilient strip 92 as shown is utilized. However, each valve seat extension opening 89 can be provided with its own separate resilient strip of material 92. It must be noted that the flexibility of resilient strip 92 is a design variable. It is believed that resilient strip 92 aids in the fine metering characteristics of dispensing gun 10. As already noted, dispensing gun 10 is provided with a plurality of nozzles 13 having various outlet tip 58 configurations suitable for specific applications. In those applications requiring a small bead of polyurethane foam to be applied such as in a window frame sealant application, a nozzle having a relatively long outlet tip 58 with a narrow opening 62 is provided with a stiffer resilient strip 92 then that which may be provided in a universal nozzle provided with the kit. Still further, there are applications where full flow of the gun is required. For example, mining applications which use polyurethane foam to seal shaft "doors" or "bulkheads" in mine shafts in the event of a fire require the dispensing gun to meter the components at very high dispensing rates. In such applications, nozzle 13 would be supplied without resilient strip 92.

The choice of flexibility or rigidity of resilient strip 92 is believed to be a factor also with respect to "post" drip which is foam dripping from outlet tip 58 when dispensing gun 10 is stopped. To some extent post drip is inherent and will always occur because the components within static mixer of mixing chamber began to react and force the foam from outlet tip 58. It is believed that, depending on the rigidity of resilient strip 92, a seal can be additionally maintained at valve seat extension opening 89. The rigidity of resilient strip 92 has to be balanced against gun performance so that full flow performance is not adversely affected. However, to the extent resilient material 92 snaps back into contact with valve seat extension opening 89, some additional sealing assistance in alleviating post drip may be present.

Referring still to FIGS. 5, 6 and 7, it can be seen that the cross-sectional area of nozzle 13 at its entrance end, i.e., collar 76 is greater than the cross-sectional area of inlet chamber 60 at its exit end, i.e., the intersection with mixing chamber 59. The nozzle wall forming inlet chamber 60 has semi-circular portions 96 corresponding to nose edge surfaces 67, 68 which take the shape of truncated cones as the nozzle extends from its entrance to its exit end. Similarly, the wall forming nozzle chamber 60 also has top and bottom flat portions 97 corresponding to nose straight edge surfaces 69, 70 which assume a triangular shape as inlet chamber 60 transitions from its entrance to its exit end. Generally speaking, inlet chamber 60 is in the shape of a funnel or a truncated cone. This configuration is believed to result in a somewhat smooth flow of the "A" and "B" liquid components into mixing chamber 59 as they travel through inlet chamber 60 after exiting valve seat extension openings 89. That is, significant mixing or contact of the "A" and "B" components does not occur while components are flowing through inlet chamber 60. In this regard, reference can be had to FIG. 15 in which it can be seen that the flexure of resilient strip 92 will direct components "A" and "B" away from one another towards semi-circular portions 96 of inlet chamber 60. It is, of course, understood that some quantity of the "A" and "B" components will contact one another at the center of inlet chamber 60. It is not believed that the contact is detrimental to the gun operation because the flow within inlet chamber 60 is somewhat non-turbulent. Contact at the nozzle center will thus occur at a somewhat laminar flow condition while the components are directed into static mixer 63. Further, there may be some benefit to a slight mixing contact just prior to entering mixing chamber 59. The geometry of the centrally positioned valve seat protrusions 72, 73, within nozzle inlet chamber 60 which is frusto-conical in combination with resilient strip 92 provides a generally smooth, somewhat non-turbulent flow of the "A" and "B" components, maintained somewhat separately, to the inlet of static mixer 63. The flow does not experience any impingement against corners or dead end against any flat wall surfaces. Thus, the non-turbulent type flow of the "A" and "B" components within gun body 12 is carried through nozzle 13.

It is to be appreciated that the interaction between the "A" and "B" components within nozzle 13 are complex. Further, the words "laminar" and "turbulent" are not used herein in their strict, classical sense but are used in a relative sense. The "quiescent" nature of inlet chamber 60 is believed verified by tests. In these tests, dispensing gun 10 was actuated to shoot foam and the gun and nozzle was left undisturbed for various lengths of time before the gun was reshot with the original nozzle in place. Observations noted are as follows:

| Test # | Length of Time Between Shots | Observations |
| --- | --- | --- |
| 1 | 30 sec. | No effect to dispensing seen |
| 2 | 1 min. | No observable defect-Note: This is time limit of current gun nozzle w/std. System. |
| 3 | 2 min. | Very slight observable effect to spray pattern, but gun and nozzle still operable |
| 4 | 3 min. | Initially spray pattern is effected, but "plug" of cured foam forced out by pressure of spray to make nozzle still operable |
| 5 | 4 min. | Similar to test #4, but plug more reticent to remove |
| 6 | 5 min. | Spray pattern is visibly effected. Plug must be physically removed, but gun and nozzle still operable-no crossover. |

As a comparison, conventional dispensing guns (with one known exception) will generally clog to a point of inoperability within about one to two minutes of inactive use following initial spraying. The nozzles of conventional dispensing guns are generally cylindrical with end walls which the "A" and "B" components impinge or dead end before reaching the mixing chamber. This impingement is believed to produce "turbulent" flow. The known exception relates to nozzle design where a central wall in the nozzle divides the nozzle into two separate compartments such as shown in U.S. Pat. No. 5,462,204. Since the nozzle has two compartments, the "clogging time" has been stated (and verified by tests) to be in the range of five minutes. The nozzle of the present invention, without being compartmentalized, approaches that clogging time, but without incurring the potential "downside" believed caused by the wall in gun operation. That is, it is believed that the presence of the wall (in combination with the shape of the mixing chamber) limits the ability of the gun to dispense the "A" and "B" components at full or high flow gun applications. In short, a resistance is believed created within the nozzle's inlet chamber which adversely effects full flow through the nozzle. This is not believed to occur in funneled nozzle 60 without any dividing wall.

Figure 16:
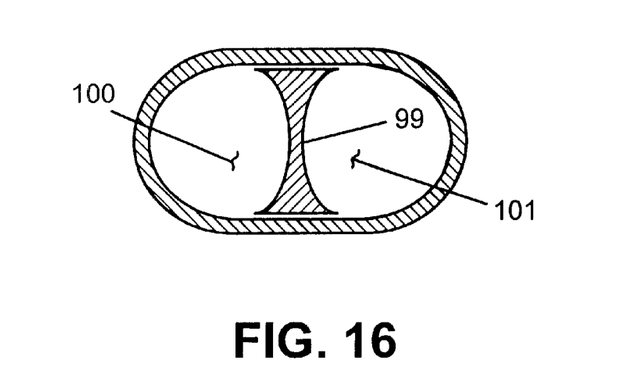
FIG. 16 is a section view of the nozzle taken along lines 16—16 of FIG. 15.

Nevertheless, reference should be had to FIGS. 15 and 16 which illustrate an alternative embodiment to nozzle 13 which can be utilized for applications requiring fine metering of the "A" and "B" components. In the alternative embodiment illustrated, a central wall 99 is provided. Central wall 99 extends from static mixer 63 to a distance short of resilient strip 92 so as not to affect flexure of resilient strip 92. While wall 99 could be a flat, straight wall, it is preferred that the wall be curved such as shown in FIG. 16 providing two truncated cone "A" and "B" component passage ways 100, 101 in nozzle inlet chamber 60. Truncated cone passageways 100, 101 positively assure generally non-turbulent liquid component flow until the components reach static mixer 63, which as noted above, enhance the metering characteristics of dispensing gun 10. While wall 99 does not divide the nozzle into two separate compartments as in the known prior art nozzles, wall 99 serves to maintain the components separate at the inlet of mixing chamber 59. The funneling nature of nozzle inlet chamber 60 is enhanced. While tests have not been conducted, some improvement in the "clogging" time is expected, and where the wall is curved, the possible adverse effects at very high flow may be somewhat alleviated.

Figure 13A:
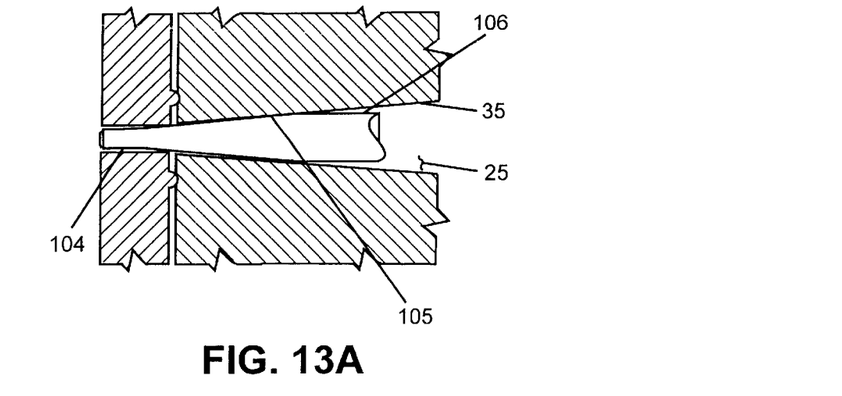
FIGS. 13A, 13B, and 13C are schematic elevation views illustrating various positions of the metering rod in the valve seat of the gun of the present invention.
Figure 13B:
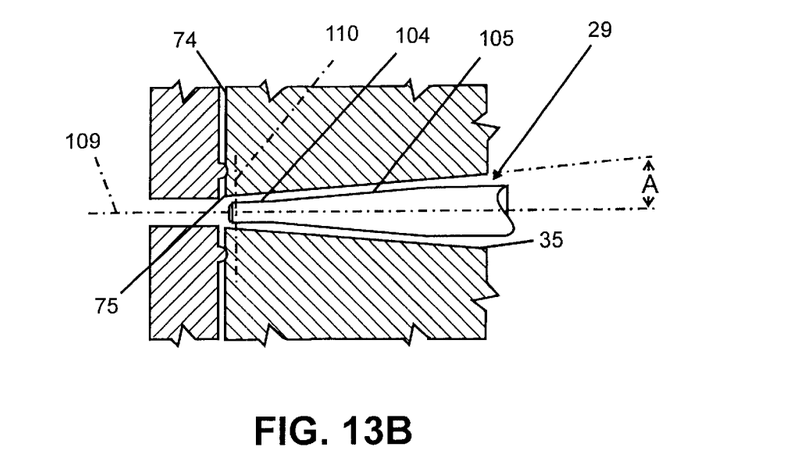
Figure 13C:
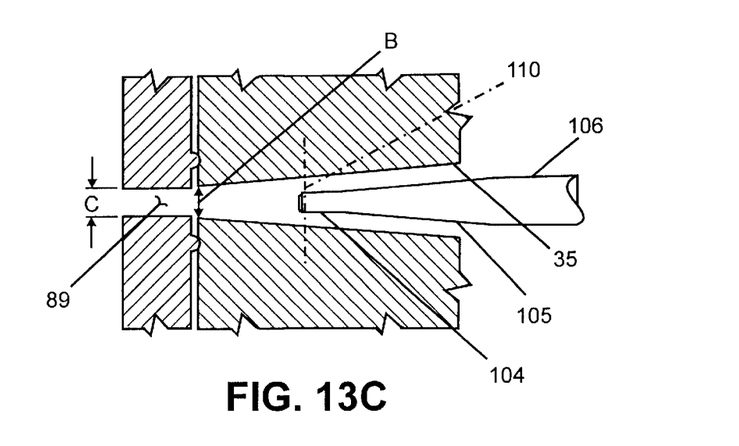

Referring now to FIGS. 13A, 13B, and 13C, tip section 29 of each metering rod 28 has a cylindrical tip portion 104 at its end terminating in a truncated cone or frusto-conical portion 105 which in turn terminates in a larger cylindrical portion 106 which intersects with intermediate sealing section 30. Metering tip section 29 as thus defined is conventional and is traditionally used in one-component dispensing guns and also used in two-component guns such as the '204 patent and assignee's '308 patent, although, when used in two-component guns, the metering tip has been used in combination with other valves.

Valve seat 35 is a frusto-conical or truncated cone seat. Both frusto-conical valve seat 35 and truncated cone metering rod portion 105 form the same angle with longitudinal centerline 109 of each dispensing passage 25,26 designated by reference arrow "A" in FIG. 13B. For reasons which will be discussed, truncated cone angle A is not to exceed about 10°. Frusto-conical valve seat 35 reduces to a minimum at valve seat opening 75 in flat end surface 74 designated by reference letter B in FIG. 13C which is the minor diameter of the frusto-conical surface forming valve seat 35. Diameter B is slightly larger than the outside diameter of cylindrical tip portion 104. In the preferred embodiment of the invention, valve seat extension opening 89 is cylindrical and has a diameter indicated by reference letter C in FIG. 13C which is equal to or greater than diameter B. However, in an alternative embodiment of the invention, diameter C is less than diameter B (but still greater than metering rod cylindrical tip portion 104) and can extend for some slight distance (i.e., ⅛ to ¼ ) into valve seat 35 before the valve seat assumes its conical configuration.

Each dispensing passage 25, 26 is sealed when truncated cone portion 105 of metering rod 28 seats against frusto-conical valve seat 35 as shown in FIG. 13A. When metering rod 28 initially is pulled rearward in dispensing passage 25, or 26, the annular clearance space which exists between cylindrical tip portion 104 and valve seat extension opening 89 can function as the metering orifice and remains relatively constant until nozzle tip portion 104 exits valve seat extension opening 89 such as shown in FIG. 13B. When metering rod 28 is retracted to positions as shown in FIGS. 13B and 13C, metering occurs at the distance or clearance (i.e., orifice) between the end of metering tip portion 104 and frusto-conical valve seat 35, generally in the annular space occupied by dot-dash lines 110 in FIGS. 13B and 13C (technically dot-dash lines are perpendicular to frusto-conical valve seat 35). Specifically, the smallest (diametrical) opening, whether in valve seat extension opening 89 (designated by reference letter "C" in FIG. 13C) or in frusto-conical valve seat 35 (designated by reference letter "B" in FIG. 13C) is larger in area than the clearance between cylindrical tip portion 104 and frusto-conical valve seat 35 lying generally along dot-dash line 110 throughout the travel of metering rod 28 (between full open and close portions of trigger lever 44). If valve seat extension opening "C" (89) is sized significantly larger than the minimum diametrical opening of frusto-conical valve seat 75, (reference letter "B"), variable metering will occur once cylindrical tip 104 clears "B". If, in an alternative embodiment of the invention, valve seat extension opening "C" (89), (and the extension of "C" into the frusto-conical valve seat 35) is sized smaller than the minor diameter of frusto-conical valve seat 35 (i.e., the frusto-conical surface thereof), a somewhat constant "fine" metering of the components will occur until the end of cylindrical tip portion 104 reaches the frusto-conical surface of frusto-conical valve seat 35.

Dimensionally the areas of cylindrical tip portion 104, the truncated cone angle of metering rod 28 and frusto-conical valve seat 35 (reference letter "A" less than 10°), and the minor diameter of frusto-conical valved seat 35 (reference letter "B") are selected so that the minimum annular clearance between cylindrical tip portion 104 and frusto-conical valve seat 35 at the fully retracted position of metering rod 28, i.e., full open, is equal to or less than the minimum diametrical opening 75 of frusto-conical valve seat 35, i.e., reference letter "B". In the preferred embodiment, the fully open portion of dispensing gun 10 establishes an orifice between metering rod cylindrical tip portion 104 and frusto-conical valve seat 35 of about 94–96% of the area of valve seat opening 75, defined, in the preferred embodiment as the minor diameter of frusto-conical valve seat 35. This relationship allows variable metering of the gun throughout its travel range. In all cases, metering rod tip portion 104 is within the frusto-conical surface of frusto-conical valve seat 35 and functions as the orifice. Valve seat extension opening 89, in the preferred embodiment, is sized greater than minimum frusto-conical diameter "B". In the alternative embodiment, the diameter of valve seat extension opening "C" is sized equal to or less than minimum frusto-conical diametrical opening "B" for generally constant fine metering of the gun over an initial travel. In both embodiments, variable progressive metering occurs when cylindrical tip portion 104 is within the frusto-conical surface of valve seat 35.

Dispensing gun 10 of the present invention exhibits excellent metering characteristics throughout its range of travel. Without wishing to be bound by any theory of operation, it is believed the arrangement described is especially advantageous for polyurethane foam in which chemical components, such as fluorocarbons, expand from a liquid to a gaseous state at defined pressures for a given temperature. In particular, a pressure gradient exists about the variable orifice which, as defined, is the minimum distance between the frusto-conical surface of frusto-conical valve seat 35 and cylindrical tip portion 104 of metering rod 28. As the orifice opens the gradient expands increasing the distance whereat state change of the chemical occurs. This result, in turn, increases the backpressure exerted by the components on the orifice as the gun is increasingly opened. This increase in backpressure is believed to partially account for the improved metering of dispensing gun 10 especially at higher flow conditions. Thus, dispensing gun 10 of the present invention is able to dispense the components at slow flow rates and controllably meter the components at high or full rates at the limits of the gun's travel.

It should be noted that the length of cylindrical tip portion 104 is not especially significant, about ⅛ in the preferred embodiment. While most dispensing guns employ some form of a pivot arm arrangement for the gun's trigger, and the travel of any pivoting lever can be increased by increasing the lever length, there is a limit to the lever length and it is desirable to provide some form of increased motion for the gun's trigger when fine metering of the A and B components is desired, whether the fine metering is progressively variable as in the preferred embodiment or constant for a fixed travel length as in the alternative embodiment.

Figure 14A:
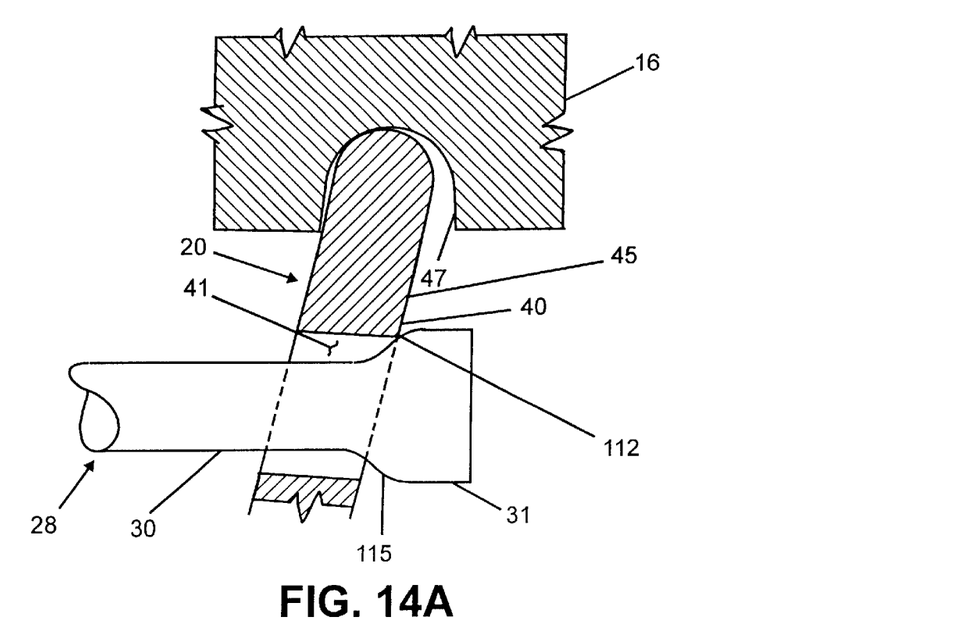
FIGS. 14A and 14B are schematic partially sectioned views indicating the position of the metering rod and trigger during operation of the dispensing gun of the present invention.
Figure 14B:
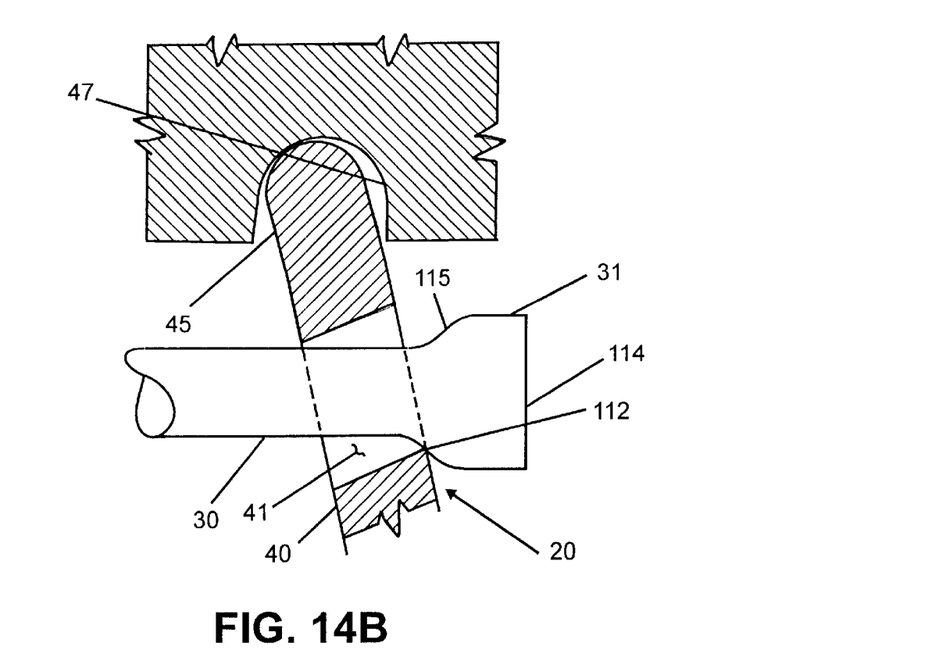

Referring now to FIGS. 14A and 14B, there is shown a pivoting arrangement used in dispensing gun 10 which provides increased travel of trigger 20 to enhance fine metering of dispensing gun 10 while also providing increased control of dispensing gun 10 at full flow conditions. Trigger body portion 16 as noted has a U-shaped trigger recess 47 formed therein. Trigger pivot portion 45 of trigger 20 simply fits within U-shaped recess 47 and because the curved portion of trigger pivot 45 is a sharper radius than that of trigger recess 47 there is some translational movement of trigger 20 when trigger lever 44 is moved such as shown when comparing the relative trigger positions of FIGS. 14A and 14B. Thus, trigger pivot 45 is not fixed in the sense of being pinned or journaled within a fixed pivot. While spring 50 will maintain the curved surfaces together in rolling contact there will be some translation which is believed to assist in lever travel at the travel limits. Yoke crossbar portion 40 of trigger 20 at its intersection with elongated metering rod opening 41, makes a line contact 112 with yoke collar section 31 of metering rod 28. Yoke collar section 31 of metering rod 28 has a flat spring base surface 114 at its end, i.e., the end of metering rod 28, and an annular surface 115 at the intersection of intermediate sealing section 30 with yoke collar section 31. Annular surface 115 is chamfered (as a straight line) or curved or formed as a compound curve such as the S-shaped curve shown in FIGS. 14A, 14B, to provide a camming surface for crossbar line contact 112. Forming annular surface 115 as a camming surface allows increased motion of trigger lever 44 at the limits of longitudinal travel of metering rod 28. The increased motion allows for better operator control and gun feel for fine and full open metering applications.

Figure 17:
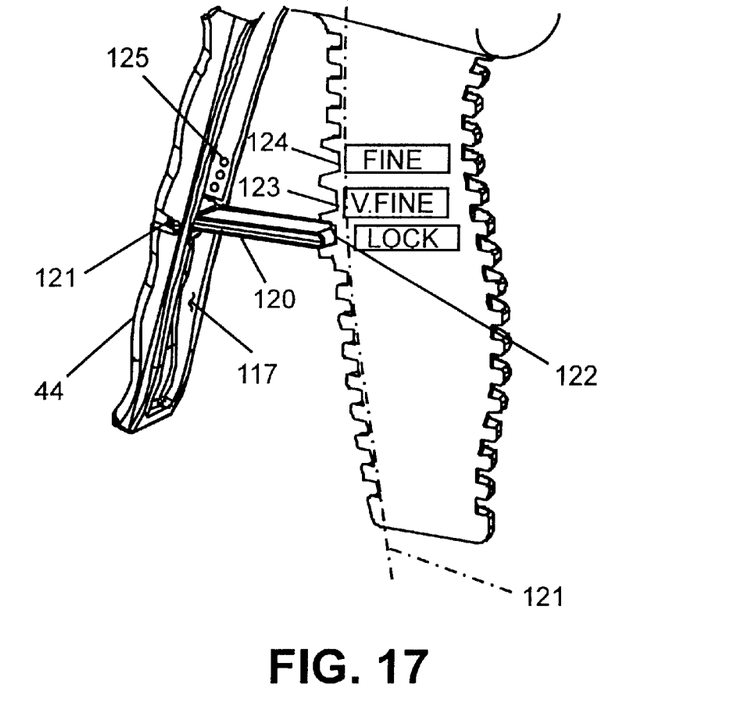
FIG. 17 is an elevation view of the handle and trigger portions of the dispensing gun showing grooves for the lock tab of the dispensing gun; and, FIG. 18 is a front view of the nose surface of the dispensing gun of the present invention.

Referring now to FIGS. 1, 3 and 17 (in which handle body portion 18 has been "sliced" to better illustrate the invention) trigger lever 44 is formed with a trigger lever recess 117 which faces or opens to handle body portion 18. Within trigger lever recess 117 is a lock tab 120 which at one end has ears 121 snapped into openings formed in trigger lever 44 so that lock tab 120 is pivotal into and out of trigger lever recess 117. Handle body portion 18 has its surface which faces trigger lever 44 in the form of a curve or arc indicated by dot-dash line 121 in FIG. 17 from which a series of indentations forming grooves are formed. In particular, one groove is formed as a locking groove 122 into which lock tab 120 is positioned as shown in FIGS. 1–3 and at which trigger 20 is locked to render the gun inoperable. In accordance, however, with the fine metering aspects of the invention, additional grooves 123 and 124 are also provided which allow some motion of trigger lever 44 until locking tab seats in the groove. In accordance with the preferred embodiment, grooves 123, 124 provide a fixed stop corresponding to a fixed orifice size between cylindrical tip portion 104 of metering rod 28 and frusto-conical valve seat 35. In accordance with the alternative embodiment, (smaller orifice "C") very fine metering groove 123 establishes a generally constant, very fine metering stop. In order to provide positive placement of lock tab 120, bumps or protrusions 125 can be formed within trigger lever recess 117 at which lock tab 120 assumes a pivoted position engaging the intended locking groove.

The invention has been described with reference to a preferred and alternative embodiments. Alterations and modifications will become apparent to those skilled in the art upon reading and understanding the Detailed Description of the Invention set forth above. It is intended to include all such alterations and modifications insofar as they come within the scope of the present invention.

Having thus defined the invention, it is claimed:

1. A detachable nozzle for use in a liquid two-component dispensing gun having a flat front surface defined as a nose from which a pair of valve seat openings are formed in two protrusions that extend from said nose of the gun, said nozzle comprising:

said nozzle having a back plate filling and closing one end thereof; said back plate having a pair of cup shaped recesses for receiving said protrusions when said nozzle is attached to said dispensing gun with said back plate adjacent or abutting said nose of said dispensing gun; each cup shaped recess having a valve extension seat opening at a base thereof in registry with said valve seat opening in said protrusion; and, said back plate and said protrusions are plastic and an exterior surface of the base of each cup shaped recess has a sealing ring concentric with the valve seat extension opening formed in the base of the cup-shaped recess, said sealing ring deforming or being deformed by an end face of the protrusion when the nozzle is affixed to the dispensing gun.

2. The nozzle of claim 1 wherein said nozzle at said one end thereof being in the shape of said back plate and having a cross-sectional configuration defined by a pair of generally straight edges spanning a distance between centers of said valve seat openings with each straight edge terminating at a semi-circular edge so that a pair of semi-circular edges connects a pair of straight edges at their end in an oval or elliptical configuration;

and said nozzle having a hollow inlet chamber extending from said one end, a cylindrical mixing chamber adjacent said inlet chamber and defining a generally circular cross-sectional intersection therewith and a tip adjacent the opposite end of said mixing chamber; said inlet chamber defined by wall portions extending from said one end thereof to said intersection of said mixing chamber, said wall portions including i) a pair of curvilinear portions, each curvilinear portion extending from said semi-circular edge to said circular intersection in the form of a generally frusto-conical wall portion and a pair of flat wall portions extending from said straight edge portions to said circular wall portion in a generally triangular or trapezoidal shape.

3. The nozzle of claim 2 wherein said one end of said nozzle has a generally straight line pivoting lip extending from said nozzle adjacent one of said straight edges and a latch extending away from said nozzle adjacent the opposite straight edge.

4. The nozzle of claim 1 wherein the plastic composition of said back plate is different than said plastic composition of said protrusion.

5. The nozzle of claim 1 further including a flat resilient strip of material pinned to said back plate in a flat, at rest condition and extending over a valve seat extension opening, said resilient material flexing out of contact with said valve seat extension opening when pressure of liquid component discharged through said valve seat extending opening is greater than pressure of liquid components in the nozzle and sealing said valve seat extension opening when the pressure of the liquid components within the nozzle is greater than pressure of liquid component in the protrusion whereby cross-over into the dispensing gun between the liquids within the nozzle is alleviated.

6. In a detachable nozzle for use in a dispensing gun for spraying polyurethane foam or froth by separately ejecting two liquid components supplied under pressure to said gun through a pair of metered valve seat openings formed in two protrusions extending from a flat nose surface at the front of the gun, the improvement comprising:

a) a nozzle having an integral back plate fused thereto filling and closing one end thereof; said back plate having a pair of cup shaped recesses for receiving said protrusions when said nozzle is attached to said dispensing gun with said back plate adjacent or abutting said nose of said dispensing gun; each cup shaped recess having a valve extension seat opening at a base thereof in registry with the valve seat opening in said protrusion;

said nozzle one end in the shape of said back plate having a cross-sectional configuration defined by a pair of generally parallel straight edges spanning t & distance between said valve seat openings with each straight edge terminating at each of its ends with a semi-circular edge generally concentric with said valve seats, said cross-sectional configuration of said one end extending a longitudinal distance generally equal to the depth of said cup shaped recess;

b) said nozzle having a hollow inlet chamber adjacent said one end thereof, a cylindrical mixing chamber adjacent said inlet chamber containing a static mixer therein and a dispensing tip adjacent said mixing chamber; the intersection of said mixing chamber and said inlet chamber having a generally circular cross-sectional configuration; and, c) said inlet chamber having a configuration defined by the interior surfaces of nozzle wall portions including a pair of spaced curvilinear wall portions, each curvilinear wall portion extending from said semi-circular edge at said one end of said cylinder to said circular intersection in a generally frusto-conical shape and a pair of generally flat wall portions, each flat wall portion extending from one of said straight edges to said circular intersection in a generally triangular shape.

7. The improvement of claim 6, further including a flat resilient strip of material pinned to said back plate in a flat, at rest condition and extending over a valve seat extension opening, said resilient material flexing out of contact with said valve seat extension opening when pressure of liquid component discharged through said valve seat extending opening is greater than pressure of liquid components in the nozzle and sealing said valve seat extension opening when the pressure of the liquid components within the nozzle is greater than pressure of liquid component in the protrusion whereby cross-over into the dispensing gun between the liquids within the nozzle is alleviated.

8. The improvement of claim 6 wherein said one end of said nozzle has a generally straight line pivoting lip extending from said nozzle adjacent one of said straight edges and a latch extending away from said nozzle adjacent opposite straight edge.

9. The improvement of claim 6, wherein said back plate and said protrusions are plastic and an exterior surface of the base of each cup shaped recess has a sealing ring concentric with the valve seat extension opening formed in the base of the cup-shaped recess, said sealing ring deforming or being deformed by an end face of the protrusion when the nozzle is affixed to the dispensing gun.

10. The improvement of claim 9 wherein the plastic composition of said back plate is different than said plastic composition of said protrusion.

* * * * *